United States Patent
Kanzawa

(10) Patent No.: US 7,966,507 B2
(45) Date of Patent: Jun. 21, 2011

(54) POWER-SUPPLY CONTROL DEVICE THAT CONTROLS POWER SUPPLY TIMING TO CIRCUIT ELEMENTS

(75) Inventor: Tomokazu Kanzawa, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 700 days.

(21) Appl. No.: 11/960,101

(22) Filed: Dec. 19, 2007

(65) Prior Publication Data

US 2008/0155290 A1 Jun. 26, 2008

(30) Foreign Application Priority Data

Dec. 22, 2006 (JP) ................................ 2006-346217

(51) Int. Cl.
*G06F 1/32* (2006.01)
(52) U.S. Cl. .................... 713/323; 713/300; 713/324
(58) Field of Classification Search .................. 713/323, 713/324
See application file for complete search history.

(56) References Cited

U.S. PATENT DOCUMENTS

| | | | | | |
|---|---|---|---|---|---|
| 5,479,335 | A | * | 12/1995 | Saito et al. ....................... | 363/65 |
| 6,049,482 | A | * | 4/2000 | Aritome et al. ........... | 365/185.24 |
| 6,826,705 | B2 | * | 11/2004 | Tani .............................. | 713/320 |
| 7,173,664 | B2 | * | 2/2007 | Watanabe et al. ............. | 348/372 |
| 2005/0213380 | A1 | * | 9/2005 | Taniguchi et al. ........ | 365/185.11 |
| 2009/0015064 | A1 | * | 1/2009 | Huang ........................... | 307/21 |

FOREIGN PATENT DOCUMENTS

JP 2004-266661 9/2004

* cited by examiner

*Primary Examiner* — Nitin C Patel
(74) *Attorney, Agent, or Firm* — Oblon, Spivak, McClelland, Maier & Neustadt, L.L.P.

(57) ABSTRACT

A power-supply control device controls power-supply timings for supplying powers from an external power supply unit to a plurality of circuit elements having different power-supply timings. The circuit elements are grouped into a plurality of power-supply lines based on power-supply timings required by the circuit elements. The power-supply timings for supplying powers from the external power supply unit are controlled in an order in response to the power-supply timings required by the circuit elements for each of the power-supply lines.

8 Claims, 5 Drawing Sheets

POWER-SUPPLY CONTROL DEVICE THAT CONTROLS POWER SUPPLY TIMING TO CIRCUIT ELEMENTS

CROSS-REFERENCE TO RELATED APPLICATIONS

The present application claims priority to and incorporates by reference the entire contents of Japanese priority document 2006-346217 filed in Japan on Dec. 22, 2006.

BACKGROUND OF THE INVENTION

1. Field of the Invention

The present invention relates to a technology for controlling power-supply timings for supplying powers to circuit elements of a plurality of power-supply lines in an image forming apparatus.

2. Description of the Related Art

In an image processing device for an image forming apparatus such as a copier, a facsimile (fax), a printer, a scanner, and a multifunction product (MFP), an output capacity and the number of output lines of a power source tends to increase with an improvement of image-processing performance. Particularly, the MFP includes a plurality of modules for controlling various functions each having a control circuit including a plurality of central processing units (CPUs). A power source of the MFP needs to supply predetermined powers to circuit elements of the modules, so that the capacity and the number of output levels of the power source are increased. Therefore, the MFP employs a power source including a plurality of output lines each of which outputs a power with the same level.

In a so-called power-saving mode, if no operation is performed on the MFP for a predetermined time after the power is turned on, the MFP shifts sequentially to a higher power-saving state from a standby mode, a preheating mode, a low-power mode, and to a sleep mode.

In an apparatus that has the power-saving mode and a plurality of power-supply lines, if power-on timings (power-supply timings) of the power-supply lines are not set in an appropriate order, a sneak current flows between semiconductor circuits, which affects lifetimes of semiconductor elements.

An image forming apparatus disclosed in Japanese Patent Application Laid-open No. 2004-266661 includes a timing generating unit to which a power is supplied while a main switch is on. A power to be supplied to mechanical units and function circuits constituting the image forming apparatus is divided into a plurality of power-supply lines. When the image forming apparatus is turned on, powers from the power-supply lines are supplied in a predetermined order of power-supply timings, and when the image forming apparatus changes a mode between power-saving states, a change of the mode is performed by controlling the order of power-supply timings.

In a conventional technology, the image forming apparatus includes a power source that is divided into a plurality of power-supply lines. The powers from the power-supply lines are supplied in a predetermined order of power-supply timings at the time of turning on the power, and a change of the mode between power-saving states is performed by controlling the order of the power-supply timings. Therefore, there is room for improvement for preventing the sneak current between semiconductor circuits more appropriately, so that the lifetimes of the semiconductor elements are maintained.

Specifically, in the conventional technology, the sneak current between the semiconductor circuits is prevented in the level of the whole apparatus by controlling the order of the power-supply timings; however, the sneak current occurs also in each of the power-supply lines in the image forming apparatus. For example, an image-data transfer circuit for transferring image data, which is a function circuit inside a power-supply line, uses a first power-saving mode power that is supplied even in the power-saving mode and a second power-saving mode power that is not supplied in the power-saving mode, the conventional technology cannot prevent the sneak current in the level of each power-supply line.

The image-data transfer circuit uses a first power generated from the first power-saving mode power and a second power generated from the second power-saving mode power supplied to the image-data transfer circuit at an output timing of the power supply unit (PSU), and the first power is controlled by a control signal from a controller, while the second power is generated irrespective of the control signal. Therefore, when the first power and the second power are supplied without considering the timing, and if the power-supply timings of the first power and the second power coincide or an interval between the power-supply timings is short, the second power may be generated before the first power, causing the sneak current between the semiconductor circuits (between the circuit elements).

In other words, although it is considered that the first power-saving mode power is generated and the second power-saving mode power is not generated in the power-saving mode, a case is still out of consideration in which the second power-saving mode power is generated and the first power-saving mode power is not generated. Therefore, a supply of the second power-saving mode power alone may cause the sneak current between the semiconductor circuits.

Moreover, because a power is typically applied from a lower voltage level, and application specific integrated circuits (ASICs) often have a specification in which a lower voltage is first supplied, no particular consideration needs to be given for power supply to the ASICs. However, some ASICs have a different specification in which a higher voltage is first supplied, which is not considered in the conventional technology. In the latter case, if a lower voltage is first supplied to the ASICs, the ASICs cannot fully satisfy the specification. In such case, although the ASICs usually operate in a normal condition, there still is a possibility of causing a malfunction, and the lifetimes of the ASICs may be shortened because of a heavy load imposed on the ASICs.

SUMMARY OF THE INVENTION

It is an object of the present invention to at least partially solve the problems in the conventional technology.

According to an aspect of the present invention, there is provided a device for controlling power-supply timings for supplying powers from an external power supply unit to a plurality of circuit elements having different power-supply timings. The device includes a grouping unit that groups the circuit elements into a plurality of power-supply lines based on power-supply timings required by the circuit elements; and a control unit that controls the power-supply timings for supplying powers from the external power supply unit in an order in response to the power-supply timings required by the circuit elements for each of the power-supply lines.

Furthermore, according to another aspect of the present invention, there is provided a method of controlling power-supply timings for supplying powers from an external power supply unit to a plurality of circuit elements having different power-supply timings. The method includes grouping the circuit elements into a plurality of power-supply lines based on power-supply timings required by the circuit elements; and controlling the power-supply timings for supplying powers from the external power supply unit in an order in response to the power-supply timings required by the circuit elements for each of the power-supply lines.

Moreover, according to still another aspect of the present invention, there is provided an image forming apparatus that supplies at least a power from an external power supply unit to a plurality of circuit elements by controlling power-supply timings, and forms an image based on image data by an operation of each of the circuit elements. The image forming apparatus includes a power-supply control device for controlling power-supply timings for supplying powers from the external power supply unit to a plurality of circuit elements having different power-supply timings. The power-supply control device includes a grouping unit that groups the circuit elements into a plurality of power-supply lines based on power-supply timings required by the circuit elements, and a control unit that controls the power-supply timings for supplying powers from the external power supply unit in an order in response to the power-supply timings required by the circuit elements for each of the power-supply lines.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
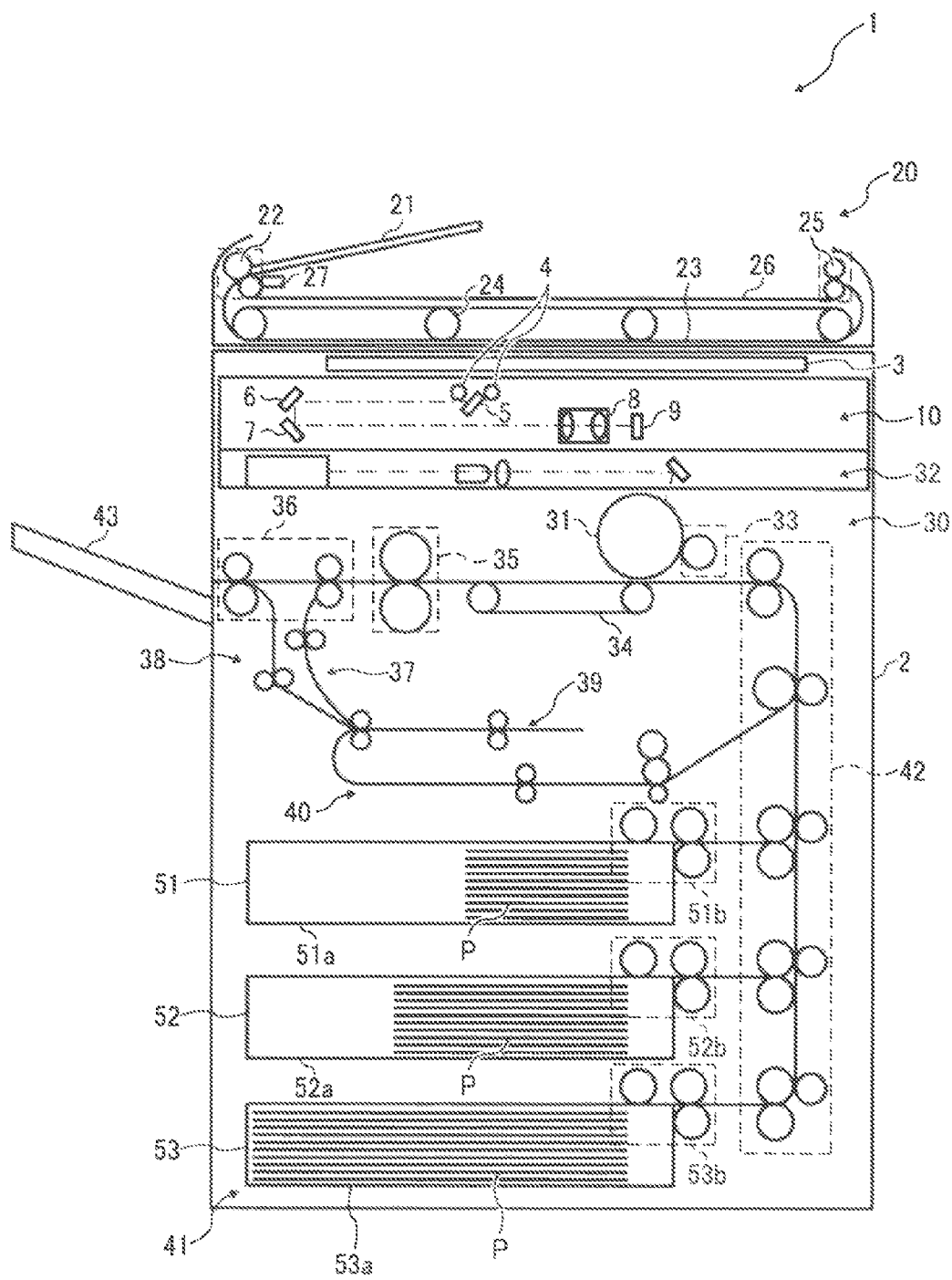
FIG. 1 is a schematic diagram of an MFP employing a power-supply control device, a power-supply control method, and an image forming apparatus according to an embodiment of the present invention.

FIG. 1 is a schematic diagram of an MFP 1 employing a power-supply control device, a power-supply control method, and an image forming apparatus according to an embodiment of the present invention.

In the MFP 1, an exposure glass 3 is arranged on the upper surface of a housing 2, and a scanner engine unit 10 is arranged in the housing 2 as shown in FIG. 1. The scanner engine unit 10 includes a lamp 4 and a first mirror 5 mounted on a first carriage (not shown), a second mirror 6 and a third mirror 7 mounted on a second carriage (not shown), a lens 8, and a charge-coupled device (CCD) 9.

The scanner engine unit 10 scans an image on a document set on the exposure glass 3 in a main scanning direction and a sub scanning direction (a right-and-left direction in FIG. 1) by moving the first carriage and the second carriage in the sub scanning direction by driving a motor (not shown).

In the MFP 1, an automatic document feeder (ADF) 20 is arranged above the housing 2 to be openable so that the upper surface of the exposure glass 3 is exposed. When the ADF 20 is open, a document can be set on the exposure glass 3, and when the ADF 20 is closed in a state where the document is set on the exposure glass 3, the ADF 20 serves as a pressure plate for pressing the document onto the exposure glass 3.

The ADF 20 includes a document tray 21, a feeding roller 22, a feeding belt 23, conveying rollers 24 arranged along the feeding belt 23, a pair of discharging rollers 25, a discharge tray 26, and a document detecting sensor 27.

When a start key on an operation display unit (not shown) is pressed in a state where documents are set on the document tray 21 with the printed sides up, the ADF 20 picks up a bottommost document of the documents by the feeding roller 22 and feeds it to the feeding belt 23. Then, the feeding belt 23 is moved by the conveying rollers 24 to feed the document to a predetermined scanning position on the exposure glass 3.

After scanning an image on the document set on the exposure glass 3 by the scanner engine unit 10, the MFP 1 discharges the document onto the discharge tray 26 by the feeding belt 23 and the discharging rollers 25.

The ADF 20 has a counting function of counting up the number of documents every time feeding of one document is finished.

When the document detecting sensor 27 detects the next document on the document tray 21, the MFP 1 feeds the next document set on the document tray 21 to the predetermined scanning position on the exposure glass 3 by the feeding roller 22 and the feeding belt 23, scans an image on the document by the scanner engine unit 10, and then discharges the document onto the discharge tray 26 by the feeding belt 23 and the discharging rollers 25 in the same manner to the above. The feeding roller 22, the feeding belt 23, and the discharging rollers 25 are driven by a conveying motor (not shown).

A plotter engine unit 30, which is arranged below the scanner engine unit 10, includes a photosensitive element (e.g., a photosensitive drum) 31, a writing unit 32, a developing unit 33, a conveying belt 34, a fixing unit 35, a path switching unit 36, a conveying path 37 for both-side image formation and sheet reversing, a reversed-sheet discharging path 38, a reversing unit 39, a conveying unit 40 for both-side image formation, a feeding-unit group 41, a conveying unit 42, and a sheet discharge tray 43. The feeding-unit group 41 includes a first feeding unit 51 to a third feeding unit 53.

In the plotter engine unit 30, a charging unit (not shown) uniformly charges the surface of the photosensitive element 31 that is driven to rotate clockwise in FIG. 1 by a main motor (not shown), and an electrostatic latent image is formed on the uniformly charged surface of the photosensitive element 31 by the writing unit 32 based on the image information scanned by the scanner engine unit 10 or the data sent from an external device (e.g., a personal computer). The developing unit 33 supplies toner to the photosensitive element 31 on which the electrostatic latent image is formed to develop the latent image into a toner image, and the conveying belt 34 that also functions as a toner image transferring unit transfers the toner image onto a sheet P that is fed from one of the first to third feeding units 51 to 53 and is conveyed by the conveying unit 42. The conveying belt 34 conveys the sheet P onto which the toner image is transferred to the fixing unit 35, in which the toner image is fixed on the sheet P. Thereafter, the sheet P is conveyed to the path switching unit 36 for switching a conveying path for the sheet P. If a reverse discharge or a both-side image formation is not selected, the sheet P with the toner image fixed thereon is discharged to the sheet discharge tray 43 provided on the side of the housing 2 by passing through the path switching unit 36. In the plotter engine unit 30, a cleaning unit (not shown) removes toner remaining on the photosensitive element 31 from which the toner image is transferred to the sheet P, a neutralizing unit (not shown) neutralizes the surface of the photosensitive element 31, and the charging unit uniformly charges the surface of the photosensitive element 31 again for the next image forming operation.

The reversing unit 39 and the conveying unit 40 are connected to the path switching unit 36 through the conveying path 37 and the reversed-sheet discharging path 38. The reversing unit 39 reverses the surface of the sheet P, and the conveying unit 40 conveys the sheet P with its surface reversed by the reversing unit 39 to a nip between the photosensitive element 31 and the conveying belt 34 through the conveying unit 42 again. When the reverse discharge or the both-side image formation is selected, the path switching unit 36 conveys the sheet P with the image fixed on one side to the reversing unit 39 through the reversed-sheet discharging path 38.

When the reverse discharge is selected, the reversing unit 39 once draws the sheet P conveyed from the path switching unit 36 to reverse the side of the sheet P, and sends out the reversed sheet P to the path switching unit 36 through the reversed-sheet discharging path 38. Then, the path switching unit 36 discharges the reversed sheet P onto the sheet discharge tray 43.

When the both-side image formation is selected, the conveying unit 40 draws the sheet P that is once drawn to the reversing unit 39 and the side of which is reversed, and sends out the sheet P to the conveying unit 42. Then, the conveying unit 42 conveys the sheet P to the nip between the photosensitive element 31 and the conveying belt 34 again to form an image on the back side of the sheet P.

The first to third feeding units 51 to 53 of the feeding-unit group 41 include first to third feeding trays 51a to 53a and first to third feeding roller units 51b to 53b, respectively. Each of the first to third feeding roller units 51b to 53b picks up the sheets P in the corresponding feeding unit one by one and sends out the sheet P to the conveying unit 42. The feeding-unit group 41 drives a feeding roller unit of a selected feeding unit, picks up the sheets P one by one in the corresponding feeding tray, and sends out the sheet P to the conveying unit 42.

The conveying unit 42 conveys the sheet P sent out from the first to third feeding units 51 to 53 to the nip between the photosensitive element 31 and the conveying belt 34.

Figure 2:
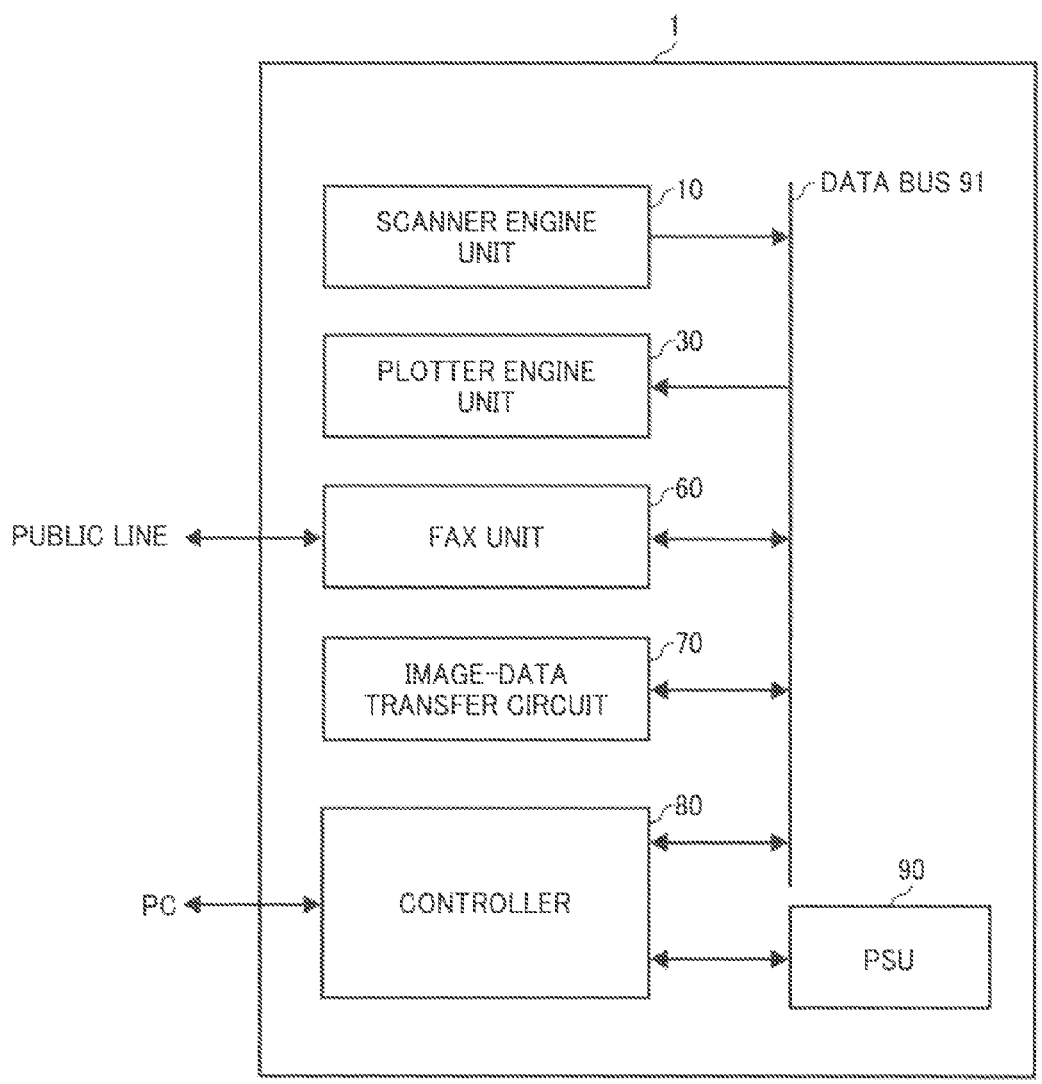
FIG. 2 is a block diagram of a relevant portion of the MFP shown in FIG. 1.

As shown in FIG. 2, the MFP 1 includes the scanner engine unit 10, the plotter engine unit 30, a fax unit 60, an image-data transfer circuit 70, a controller 80, and a power supply unit (PSU) 90 that are connected to each other via a data bus 91. The image-data transfer circuit 70 transfers image data between the scanner engine unit 10, the plotter engine unit 30, the fax unit 60, and the controller 80 via the data bus 91.

The MFP 1 has a power-saving mode. Once a predetermined time for shifting to the power-saving mode passes without any operation performed on the MFP 1, the MFP 1 stops or reduces a power supplied to the scanner engine unit 10, the plotter engine unit 30, the fax unit 60, the image-data transfer circuit 70, and the like, to shift to the power-saving mode.

The PSU 90, which is an external power source, converts a voltage of an alternating-current (AC) power from an external AC commercial power source into a predetermined voltage, converts the AC power with the predetermined voltage into a direct-current (DC) power, and converts the voltage of the DC power into a predetermined voltage, to generate DC powers of different voltages to be supplied to various units of the MFP 1.

The MFP 1 includes the operation display unit (not shown) having operation keys for operating various functions of the MFP 1 and a display such as a liquid crystal display (LCD) for displaying contents corresponding to an input by the operation keys and various pieces of information for an operator.

The MFP 1 functions as a copier, a printer, a scanner, and a facsimile by utilizing the scanner engine unit 10, the plotter engine unit 30, the fax unit 60, the image-data transfer circuit 70, and the controller 80. These functions can be switched and selected by an application switching key or the like of the operation display unit. When the copier function is selected, the MFP 1 functions as a copier, when the printer function is selected, the MFP 1 functions as a printer, when the scanner function is selected, the MFP 1 functions as a scanner, and when the facsimile function is selected, the MFP 1 functions as a facsimile.

Figure 3:
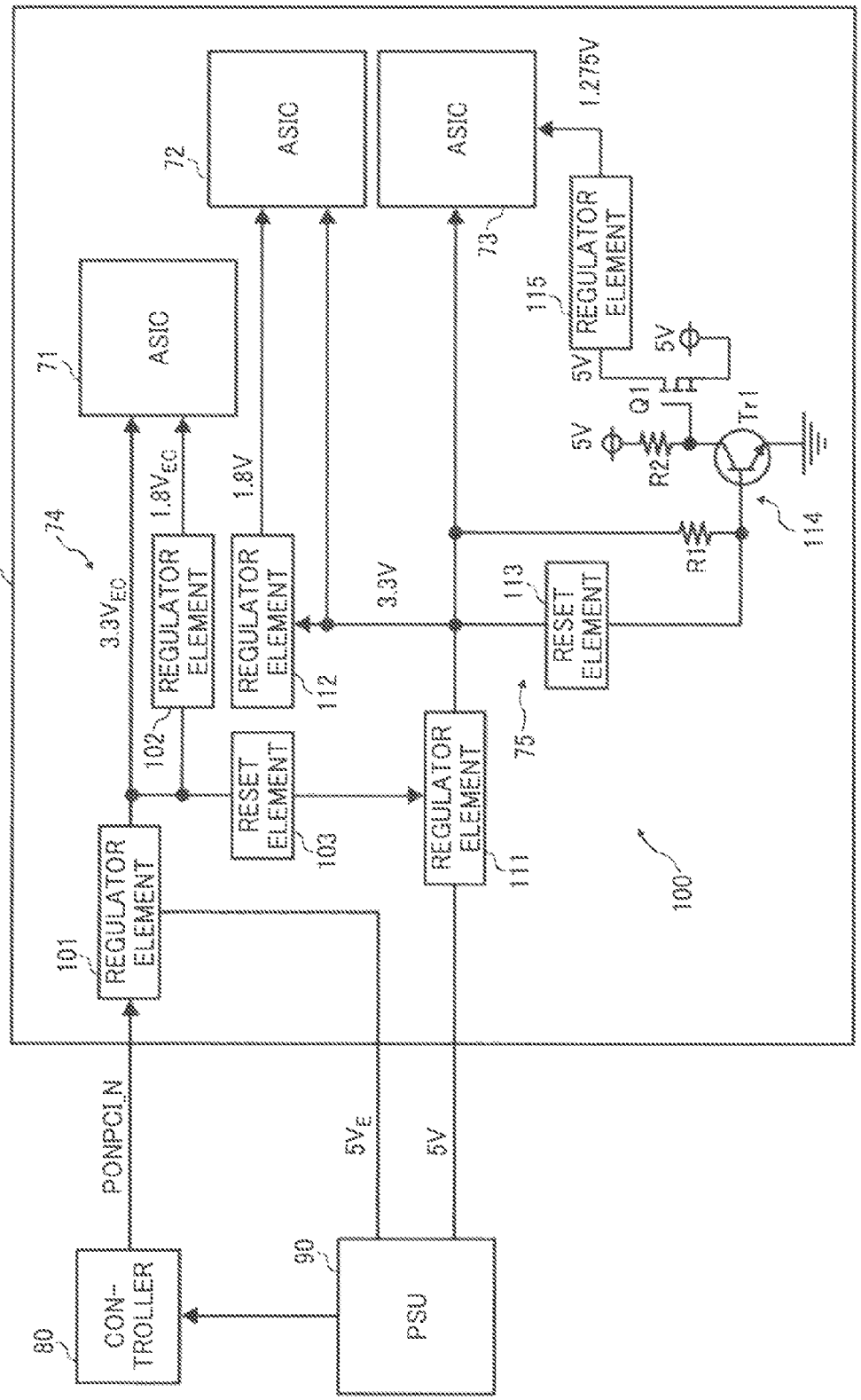
FIG. 3 is a circuit diagram of an image-data transfer circuit shown in FIG. 2.

As shown in FIG. 3, the image-data transfer circuit (the function circuit) 70 includes ASICs 71 to 73 and the power-supply control unit (the power-supply control device) 100. The ASIC 71 is a circuit element to which a power is supplied even when the MFP 1 is in the power-saving mode, the ASICs 72 and 73 are circuit elements to which a power is not supplied when the MFP 1 is in the power-saving mode, and the power-supply control unit 100 is provided with a power-supply line 74 (a first power-saving mode power-supply line, which is a power-supply line supplied even when the MFP 1 is in the power-saving mode) for the ASIC 71 and a power-supply line 75 (a second power-saving mode power-supply line, which is a power-supply line not supplied when the MFP 1 is in the power-saving mode) for the ASICs 72 and 73. The PSU 90 supplies a power of 5 $V_E$ as a first power-saving mode power that is supplied even when the MFP 1 is in the power-saving mode to the power-supply line 74 and the controller 80 of the image-data transfer circuit 70, and supplies a power of 5 V as a second power-saving mode power that is not supplied when the MFP 1 is in the power-saving mode to the power-supply line 75.

The power-supply line 74 includes regulator elements (regulator ICs) 101 and 102 for voltage conversion and a reset element (a reset IC) 103, and the power-supply line 75 includes regulator elements (regulator ICs) 111 and 112 for voltage conversion, a reset element (a reset IC) 113, a switch circuit 114, and a regulator element (a regulator IC) 115 for voltage conversion.

The PSU 90 supplies the power of 5 $V_E$ to the regulator element 101, and the controller 80 outputs a PONPCI_N signal that changes from high to low or vice versa to the regulator element 101 to control the regulator element 101. When the regulator element 101 receives a high PONPCI_N signal, the regulator element 101 turns on, converts the power of 5 $V_E$ into a first power of 3.3 $V_{EC}$, and outputs it to the ASIC 71, the regulator element 102, and the reset element 103.

The regulator element 102 converts the first power of 3.3 $V_{EC}$ from the regulator element 101 into 1.8 $V_{EC}$, and outputs it to the ASIC 71.

In the reset element 103, once a predetermined time t1 passes (refer to FIG. 4) after the first power of 3.3 $V_{EC}$ from the regulator element 101 rises to a predetermined voltage, the reset element 103 switches a low reset signal to a high reset release signal, and outputs the high reset release signal to the regulator element 111.

The PSU 90 supplies the power of 5 V to the regulator element 111, and the reset element 103 outputs the reset signal/reset release signal to the regulator element 111. When the reset release signal is input to the regulator element 111, the regulator element 111 converts the power of 5 V into a second power of 3.3 V and outputs it to the regulator element 112, the reset element 113, and the ASICs 72 and 73.

The regulator element 112 converts the second power of 3.3 V from the regulator element 111 into 1.8 V and inputs it to the ASIC 72.

In the reset element 113, once a predetermined time t2 passes (refer to FIG. 4) after the second power of 3.3 V from the regulator element 111 rises to a predetermined voltage, the reset element 113 switches a low reset signal to a high reset release signal, and outputs the high reset release signal to the switch circuit 114.

The switch circuit 114 includes a transistor Tr1, a field-effect transistor Q1, and resistors R1 and R2. The emitter of the transistor Tr1 is grounded. The output from the reset element 113 is input to a base of the transistor Tr1, and the output from the regulator element 111 is input to the base through the resistor R1 connected in parallel to the reset element 113.

The power of 5 V from the PSU 90 is input to a collector of the transistor Tr1 through the resistor R2. The collector is connected to a gate of the field-effect transistor Q1.

The power of 5 V from the PSU 90 is input between a source and a drain of the field-effect transistor Q1, and the output of the field-effect transistor Q1 is connected to the regulator element 115.

When the reset signal of the reset element 113 that is input to the base of the transistor Tr1 is switched to the reset release signal, the transistor Tr1 is turned on. When the transistor Tr1 is turned on, the field-effect transistor Q1 is turned on, so that the switch circuit 114 inputs the power of 5 V to the regulator element 115.

The regulator element 115 converts the power of 5 V from the switch circuit 114 into 1.275 V, and supplies it as a third power to the ASIC 73.

The ASIC 73 is a circuit element that needs to be supplied first with the high-voltage power of 3.3 V, and then with the low-voltage power of 1.275 V. Therefore, with the use of the reset element 113, the switch circuit 114, and the regulator element 115, the regulator element 111 outputs the second power of 3.3 V to the reset element 113 after the predetermined time t1 passes after the first power of 3.3 $V_{EC}$ from the regulator element 101 rises to the predetermined voltage in the reset element 103, the power of 5 V is input from the switch circuit 114 to the regulator element 115 after the predetermined time t2 passes after the second power of 3.3 V from the regulator element 111 rises to the predetermined voltage in the reset element 113, and the regulator element 115 converts the power of 5 V into 1.275 V to supply it as the third power to the ASIC 73.

The circuit elements of the image-data transfer circuit 70 are grouped into the power-supply lines based on the power-supply timings. The power-supply timing for supplying a power to each of the ASICs 71 to 73 is controlled to the order according to the power-supply timing demanded by each of the ASICs 71 to 73 in each of the power-supply lines. The MFP 1 reduces the power consumption in the power-saving mode. However, the ASIC 71 needs power supply even in the power-saving mode while the ASICs 72 and 73 do not need power supply in the power-saving mode, so that the power-supply timings demanded by the ASICs 71 to 73 are different from each other, and the power-supply timings are different even in each of the ASICs 71 to 73. Therefore, it is important to control the power-supply timings according to the demand by the ASICs 71 to 73 to prevent the sneak current between the ASICs 71 to 73, which results in improving safety and maintaining the lifetimes of the ASICs 71 to 73.

Particularly, in the MFP 1, the image-data transfer circuit 70 transfers image data between the scanner engine unit 10, the plotter engine unit 30, the fax unit 60, and an image-data storing unit (not shown) such as a hard disk, and the image-data transfer circuit 70 needs to transfer the image data at appropriate timings and properly in any operation mode.

Therefore, the image-data transfer circuit 70 includes the power-supply control unit 100 that divides the power-supply line into the power-supply line 74 for supplying a power to the ASIC 71 and the power-supply line 75 for supplying a power to the ASICs 72 and 73, and the power-supply control unit 100 controls the power-supply timings and the voltages of the powers supplied to the ASICs 71 to 73 at the time of turning on the main power of the MFP 1 and returning to a normal mode from the power-saving mode.

Figure 4:
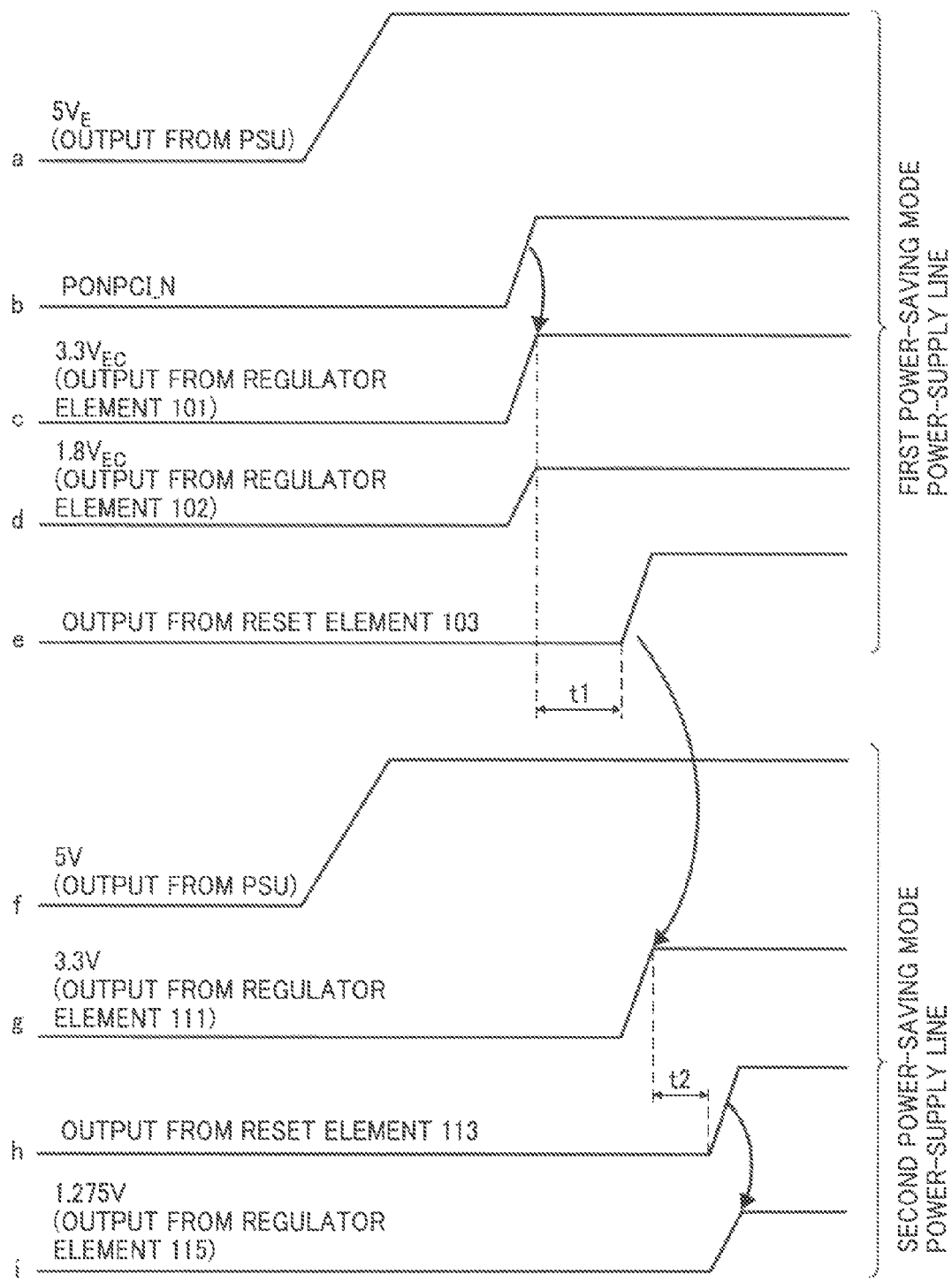
FIG. 4 is a timing chart in each unit of a power-supply control unit shown in FIG. 3 at the time of turning on the power.

The operation of the power-supply control unit 100 at the time of turning on the main power of the MFP 1 is explained referring to FIG. 4.

When the main power is turned on, the PSU 90 supplies the power of 5 $V_E$ to the power-supply line 74 and the power of 5 V to the power-supply line 75 as indicated by (a) in FIG. 4.

The power of 5 $V_E$ from the PSU 90 is supplied to the regulator element 101 in the power-supply line 74. When the PONPCI_N signal from the controller 80 goes high as indicated by (b) in FIG. 4, the regulator element 101 is turned on as indicated by (c) in FIG. 4. Then, the regulator element 101 converts the power of 5 $V_E$ into 3.3 $V_{EC}$ (the first power) to supply it to the ASIC 71 and output it to the regulator element 102 and the reset element 103.

When the first power of 3.3 $V_{EC}$ is input from the regulator element 101, the regulator element 102 converts the first power of 3.3 $V_{EC}$ into 1.8 $V_{EC}$ to supply it to the ASIC 71 as indicated by (d) in FIG. 4.

In the reset element 103, once the predetermined time t1 passes after the first power of 3.3 $V_{EC}$ from the regulator element 101 rises to the predetermined voltage, the reset element 103 switches the reset signal (Low) to the reset release signal (High), and outputs it to the regulator element 111 as indicated by (e) and (g) in FIG. 4.

The power of 5 V is supplied from the PSU 90 to the regulator element 111 as indicated by (f) in FIG. 4. When the regulator element 111 receives the reset release signal from the reset element 103, the regulator element 111 converts the power of 5 V into 3.3 V (the second power) to supply it to the ASIC 72 and 73 and output it to the regulator element 112 and the reset element 113 as indicated by (g) in FIG. 4.

Although not shown in FIG. 4, when the second power of 3.3 V is input from the regulator element 111, the regulator element 112 converts the second power of 3.3 V into 1.8 V to supply it to the ASIC 72 in the same manner to the regulator element 102.

In the reset element 113, once the predetermined time t2 passes after the second power of 3.3 V from the regulator element 111 rises to the predetermined voltage, the reset element 113 switches the reset signal (Low) to the reset release signal (High), and outputs it to the switch circuit 114 as indicated by (g) and (h) in FIG. 4.

In the switch circuit 114, when the low reset signal input from the reset element 113 to the base of the transistor Tr1 is switched to the high reset release signal, the transistor Tr1 is turned on. Then, the field-effect transistor Q is turned on, and the power of 5 V is input to the regulator element 115.

When the power of 5 V is input from the switch circuit 114, the regulator element 115 converts the power of 5 V into 1.275 V (the third power) to supply it to the ASIC 73 as indicated by (i) in FIG. 4.

Figure 5:
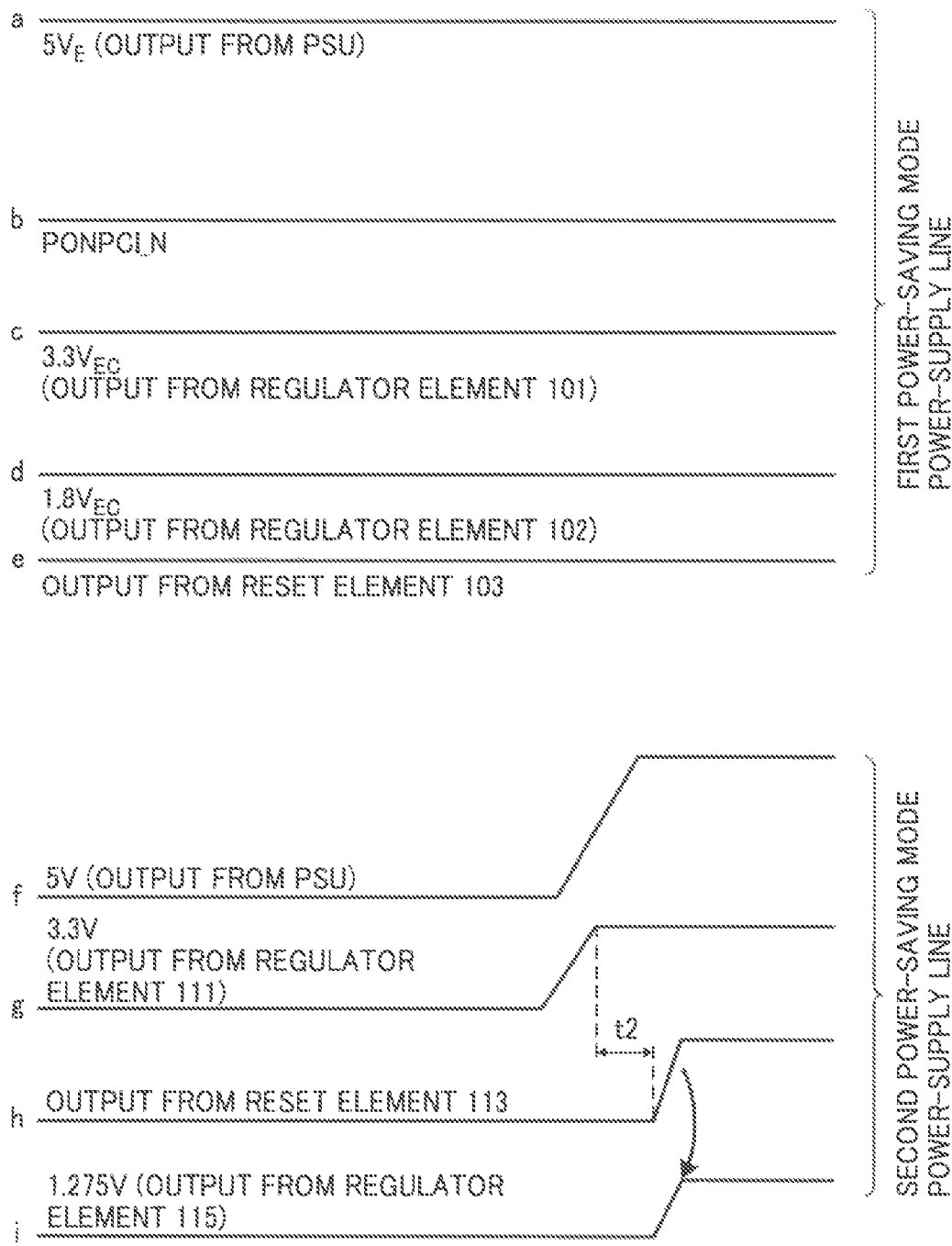
FIG. 5 is a timing chart in each unit of the power-supply control unit shown in FIG. 3 at the time of returning to a power-saving mode.

The operation of the power-supply control unit 100 at the time of returning to the normal mode from the power-saving mode is explained referring to FIG. 5.

In the power-saving mode, the power of 5 $V_E$ is supplied from the PSU 90, and the levels of powers to the regulator element 101, the regulator element 102, and the reset element 103 are all high as indicated by (a) to (e) in FIG. 5, thus outputting the powers having the predetermined voltages.

In the power-saving mode, if an operation is performed on the MFP 1 to return to the normal mode from the power-saving mode (e.g., a key on the operation display for returning to the normal mode from the power-saving mode is pressed, a document is set on the document tray 21, and the MFP 1 receives a facsimile), the power of 5 $V_E$ is supplied from the PSU 90 to the regulator element 111 as indicated by (f) in FIG. 5.

At this time, as indicated by (e) in FIG. 5, in the reset element 103, the predetermined time t1 has already passed since the first power of 3.3 $V_{EC}$ from the regulator element 101 rises to the predetermined voltage, so that the reset element 103 has output the reset release signal to the regulator element 111. Once the PSU 90 starts to supply the power of 5 V to the regulator element 111, the regulator element 111 converts the power of 5 V into 3.3 V (the second power) to supply it to the ASICs 72 and 73 and output it to the regulator element 112 and the reset element 113 as indicated by (g) in FIG. 5.

When the second power of 3.3 V is input from the regulator element 111, the regulator element 112 converts the second power of 3.3 V into 1.8 V to supply it to the ASIC 72.

In the reset element 113, once the predetermined time t2 passes after the second power of 3.3 V from the regulator element 111 rises to the predetermined voltage, the reset element 113 switches the reset signal (Low) to the reset release signal (High) to output it to the switch circuit 114 as indicated by (g) and (h) in FIG. 5.

In the switch circuit 114, when the reset signal input from the reset element 113 to the base of the transistor Tr1 is switched to the reset release signal, the transistor Tr1 is turned on. Then, the field-effect transistor Q is turned on, and inputs the power of 5 V to the regulator element 115.

When the power of 5 V is input from the switch circuit 114, the regulator element 115 converts the power of 5 V into 1.275 V (the third power) to supply it to the ASIC 73 as indicated by (i) in FIG. 5.

According to the present embodiment, the image-data transfer circuit 70 includes the power-supply control unit 100. The power-supply control unit 100 groups the ASICs 71 to 73 that are circuit elements demanding different power-supply timings by the power-supply lines 74 and 75 based on the power-supply timings demanded by the ASICs 71 to 73, and performs a power-supply timing control process in which the power-supply timing for supplying a power to each of the ASICs 71 to 73 from the PSU 90 is controlled in the order of the power-supply timing demanded by each of the ASICs 71 to 73.

Accordingly, the power is supplied to each of the ASICs 71 to 73 with the power-supply timing demanded by each of the ASICs 71 to 73, resulting in preventing a sneak current between the ASICs 71 to 73, enabling to maintain the lifetime of each of the ASICs 71 to 73.

Moreover, according to the present embodiment, the image-data transfer circuit 70 includes the ASIC 71 that needs power supply even in the power saving mode, and the ASICs 72 and 73 that do not need power supply in the power saving mode. The PSU 90 includes the power of 5 $V_E$ that is supplied even in the power-saving mode and the power of 5 V that is not supplied in the power-saving mode. The power-supply control unit 100 divides the power-supply line into the power-supply line 74 that supplies the power of 5 $V_E$ to the ASIC 71 and the power-supply line 75 that supplies the power of 5 V to the ASICs 72 and 73, and controls the power-supply timings of the power of 5 V to the ASICs 72 and 73 in the power-supply line 75 as the power-supply timing control process at the time of cancelling the power-saving mode.

Accordingly, even at the time of returning to the normal mode from the power saving mode, the power is supplied to each of the ASICs 71 to 73 at an appropriate power-supply timing, resulting in preventing the sneak current between the ASICs 71 to 73, enabling to maintain the lifetime of each of the ASICs 71 to 73.

Furthermore, according to the present embodiment, the power-supply control unit 100 performs the power-supply timing control process at the time of cancelling the power saving mode in the following manner. That is, the regulator element 101 generates the first power of 3.3 $V_{EC}$ from the power of 5 $V_E$ and outputs it to the ASIC 71 and the reset element 103. Thereafter, in the reset element 103, once the predetermined time t1 passes after the first power of 3.3 $V_{EC}$ from the regulator element 101 rises to the predetermined voltage, the reset element 103 outputs the reset release signal to the regulator element 111. Then, the regulator element 111 generates the second power of 3.3 V from the power of 5 V and outputs it to the ASICs 72 and 73, and the reset element 113. In the reset element 113, once the predetermined time t2 passes after the second power of 3.3 V from the regulator element 111 rises to the predetermined voltage, the reset element 113 outputs the reset release signal to the switch circuit 114. The switch circuit 114 inputs the power of 5 V to the regulator element 115, and the regulator element 115 converts the power of 5 V into 1.275 V to supply it to the ASIC 73.

Accordingly, even at the time of returning to the normal mode from the power-saving mode, the power can be supplied to each of the ASICs 71 to 73 at a more appropriate power-supply timing, resulting in preventing the sneak current between the ASICs 71 to 73 more appropriately, enabling to maintain the lifetime of each of the ASICs 71 to 73. Specifically, because the order of outputting the first power from the regulator element 101 and the second power from the regulator element 111 is determined, the sneak current is prevented from the output side of the regulator element 111 to the regulator element 101 between the ASICs 71 to 73. Therefore, the lifetime of each of the ASICs 71 to 73 is maintained. In addition, after the second power output to the reset element 113 from the regulator element 111 rises to the predetermined voltage, the switch circuit 114 inputs the power of 5 V to the regulator element 115, and further the regulator element 115 converts the power of 5 V into 1.275 V (the third power) to supply it to the ASIC 73. Therefore, the order of the powers supplied to the ASIC 73 can be determined. Thus, the sneak current can be surely prevented between the circuits in the ASIC 73, enabling to maintain the lifetime of the ASIC 73 more surely.

Moreover, according to the present embodiment, the regulator element 115 converts the power of 5 V output from the switch circuit 114 into 1.275 V as the third power that is lower than the second power of 3.3 V from the regulator element 111, and the third power of 1.275 V is supplied to the ASIC 73 that demands the power-supply timing in which a high-voltage power needs to be supplied before a low-voltage power.

Accordingly, the ASIC 73 having a specification in which a high-voltage power needs to be supplied before a low-voltage power is supplied with the third power of 1.275 V at least after the predetermined time t2 passes after being supplied with the second power of 3.3 V that is higher than the third power. Therefore, the power can be supplied to the ASIC 73 while appropriately controlling the order of the power-supply timing for the ASIC 73. Thus, a malfunction of the ASIC 73 can be prevented, so that the lifetime of the ASIC 73 can be maintained more surely.

As described above, according an aspect of the present invention, a plurality of circuit elements having different power-supply timings is grouped by a plurality of power-supply lines based on the power-supply timings, and timings for supplying powers from an external power supply unit to a plurality of circuit elements is controlled in response to the power-supply timings for each of the power-supply lines. Accordingly, a power can be supplied to each circuit element at an appropriate power-supply timing, so that the sneak current can be surely prevented between, and the lifetime of each circuit element can be maintained more surely.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device for controlling power-supply timings for supplying power from an external power supply unit to a plurality of circuit elements having different power-supply timings, the device comprising:
   a plurality of power-supply lines configured to supply the power to respective groups of the circuit elements, the respective groups determined based on power-supply timings required by the circuit elements; and
   a control unit that controls the power-supply timings for supplying the power from the external power supply unit in an order in response to the power-supply timings required by the circuit elements for each of the power-supply lines,
   wherein the circuit elements include
      a first circuit element that needs power even in a power-saving mode in which power is saved by stopping a power supplying; and
      a second circuit element that does not need power in the power-saving mode;
   the external power supply unit outputs a first power-saving mode power that is supplied even in the power-saving mode, and a second power-saving mode power that is not supplied in the power-saving mode;
   the power-supply lines include
      a first power-supply line for supplying the first power-saving mode power to the first circuit element; and
      a second power-supply for supplying the second power-saving mode power to the second circuit element; and
   a power-supply timing to supply the second power-saving mode power to each circuit of the second circuit element in the second power-supply line is controlled as a power-supply timing control process at a time of cancelling the power-saving mode.

2. The device according to claim 1, wherein a first power is generated from the first power-saving mode power, a second power is generated from the second power-saving mode power when a predetermined time is elapsed after the first power reaches a predetermined first voltage, and a third power is output when a predetermined time is elapsed after the second power reaches a predetermined second voltage, as the power-supply timing control process at the time of cancelling the power-saving mode.

3. The device according to claim 2, wherein
   a power having a voltage lower than a voltage of the second power is generated as the third power, and
   the second power and the third power are supplied to a circuit element that demands a power-supply timing in which a low-voltage power is supplied before a high-voltage power.

4. A method of controlling power-supply timings for supplying power from an external power supply unit to a plurality of circuit elements having different power-supply timings, the method comprising:
   grouping the circuit elements into a plurality of power-supply lines based on power-supply timings required by the circuit elements; and
   controlling the power-supply timings for supplying the power from the external power supply unit in an order in response to the power-supply timings required by the circuit elements for each of the power-supply lines,
   wherein the circuit elements include
      a first circuit element that needs power even in a power-saving mode in which power is saved by stopping power supplying; and
      a second circuit element that does not need power in the power-saving mode;
   the external power supply unit outputs a first power-saving mode power that is supplied even in the power-saving mode, and a second power-saving mode power that is not supplied in the power-saving mode;
   the power-supply lines include
      a first power-supply line for supplying the first power-saving mode power to the first circuit element; and
      a second power-supply for supplying the second power-saving mode power to the second circuit element; and
   a power-supply timing to supply the second power-saving mode power to each circuit of the second circuit element in the second power-supply line is controlled as a power-supply timing control process at a time of cancelling the power-saving mode.

5. The method according to claim 4, wherein a first power is generated from the first power-saving mode power, a second power is generated from the second power-saving mode power when a predetermined time is elapsed after the first power reaches a predetermined first voltage, and a third power is output when a predetermined time is elapsed after the second power reaches a predetermined second voltage, as the power-supply timing control process at the time of cancelling the power-saving mode.

6. The method according to claim 5, wherein
   a power having a voltage lower than a voltage of the second power is generated as the third power, and
   the second power and the third power are supplied to a circuit element that demands a power-supply timing in which a low-voltage power is supplied before a high-voltage power.

7. An image forming apparatus that supplies at least power from an external power supply unit to a plurality of circuit elements by controlling power-supply timings, and forms an image based on image data by an operation of each of the circuit elements, the image forming apparatus comprising:
   a power-supply control device for controlling power-supply timings for supplying the power from the external power supply unit to a plurality of circuit elements having different power-supply timings,
wherein the power-supply control device includes
a plurality of power-supply lines configured to supply the power to respective groups of the circuit elements, the respective groups determined based on power-supply timings required by the circuit elements; and
a control unit that controls the power-supply timings for supplying the power from the external power supply unit in an order in response to the power-supply timings required by the circuit elements for each of the power-supply lines,
wherein the circuit elements include
a first circuit element that needs power even in a power-saving mode in which power is saved by stopping a power supplying; and
a second circuit element that does not need power in the power-saving mode;
the external power supply unit outputs a first power-saving mode power that is supplied even in the power-saving mode, and a second power-saving mode power that is not supplied in the power-saving mode;
the power-supply lines include
a first power-supply line for supplying the first power-saving mode power to the first circuit element; and
a second power-supply for supplying the second power-saving mode power to the second circuit element; and
a power-supply timing to supply the second power-saving mode power to each circuit of the second circuit element in the second power-supply line is controlled as a power-supply timing control process at a time of cancelling the power-saving mode.

8. The image forming apparatus according to claim 7, wherein the circuit elements, to which the power is supplied at the power-supply timings controlled by the power-supply control device, works as a function circuit for transferring image data.

* * * * *